United States Patent Office 3,371,077
Patented Feb. 27, 1968

3,371,077
POLYMERIZATION OF VINYL ALKYL ETHERS AND RESULTING PRODUCT
John D. Calfee, Dayton, Ohio, assignor to Monsanto Company, a corporation of Delaware
No Drawing. Filed Aug. 18, 1958, Ser. No. 755,422
11 Claims. (Cl. 260—91.1)

This invention relates to the polymerization of vinyl alkyl ethers to form solid polymers of high molecular weight by the use of aluminum halide catalysts containing fluoride as at least part of the halide content of said catalysts.

An object of this invention is to prepare crystalline polymers of vinyl alkyl ethers by the use of heterogeneous catalysis.

The preparation of homopolymers of vinyl alkyl ethers has generally been carried out with the use of Friedel-Crafts catalysts or with acid-reacting condensing agents. Polymerization with these catalysts, however, gives only liquid products, unless a critical low temperature is maintained during the reaction. For example, U.S. 2,104,000 teaches the use of boron halides at a recommended temperature of between 40 and 60° C. Polyvinyl alkyl ethers prepared at these temperatures with an active catalyst, such as a boron halide, are exclusively viscous liquid products.

Vinyl isopropyl ether polymerizes explosively at 40° in the presence of a boron halide catalyst and sticky, viscous, balsamlike products are obtained; with the same monomer and catalyst the reaction proceeds with explosive violence even if the temperature is reduced to below −10° C.

When the polymerization process of U.S. 2,104,000 is used to prepare polyvinyl methyl ether at a temperature of about 10° C., and above, the polymer ranges from liquid to semi-solid.

The process of U.S. 2,799,669 teaches the polymerization of vinyl alkyl ethers using acid-reacting condensing agents as catalysts at temperatures preferably between −60 and −70° C. To prepare solid, form-stable polymers by the process taught in this patent, the polymerization must be conducted at these extremely low temperatures.

I have discovered that aluminum fluoride and aluminum chlorofluorides, prepared as I have set forth herein, catalyze the polymerization of vinyl alkyl ethers at mild temperatures to solid, high molecular weight, crystalline polymers.

Although there are applications for the gummy, semisolid polyvinyl alkyl ethers, such as adhesive compositions, there are also many applications for which these type materials are totally unsuitable. By using my discovery polyvinyl alkyl ethers are prepared that can be used in the molding, pressure-casting and extrusion fields. Thus I have prepared polymers that can be rolled or pressed into thin sheets for use in lamination work or for use as wrapper films, or for container coatings. These solid, crystalline products can be used as electrical insulators and they have applications as bases for pressure-sensitive surgical and transparent tapes. These polyvinyl alkyl ethers can also be blended with other polymers, for example, with polystyrene, polyethylene, polyvinyl chloride, etc. to prepare new compositions having the desirable properties of each constituent in said blend.

Vinyl alkyl ethers suitable as monomers for practicing my invention have the formula $CH_2=CHOR$ where R is an alkyl radical having from 1 carbon atom to about 14 carbon atoms. Examples of suitable monomers are vinyl methyl ether, vinyl ethyl ether, vinyl propyl ether, vinyl isopropyl ether, vinyl butyl ether, vinyl isobutyl ether, vinyl pentyl ether, vinyl hexyl ether, vinyl heptyl ether, vinyl octyl ether, vinyl 2-ethylhexyl ether, vinyl nonyl ether, vinyl decyl ether, vinyl dodecyl ether, vinyl tridecyl ether, and vinyl tetradecyl ether.

The alkyl substituent in the monomer molecule can be either a straight chain radical or a highly branched radical. A suitable monomer can be prepared by the reaction of acetylene with methanol, ethanol, n-butanol, n-hexanol, n-dodecanol or n-tetradecanol as representative examples. Vinyl branched-chain ethers can be prepared by the reaction of acetylene with isopropanol, isobutanol, 2-ethyl hexanol, and 3,5,5-trimethyl nonanol, for example. Branched-chain alcohols prepared by the oxo process from an olefin, carbon monoxide, and hydrogen can similarly be used to prepare suitable monomers for the practice of my invention, e.g., alcohols from nonene, propylene tetramer, triisobutylene, and diisobutylene, can be converted to the corresponding vinyl alkyl ether having a highly branched alkyl chain.

Commercial aluminum fluoride, commonly prepared by the reaction of aluminum hydroxide with hydrofluoric acid, consists of a mixture of aluminum fluoride, hydrated aluminum fluoride, and basic aluminum fluorides, and is generally characterized by the presence of crystals of relatively large size. This article of commerce is totally unsuitable for the practice of my invention.

Catalysts effective in polymerizing vinyl alkyl ethers to crystalline, solid polymers, according to my invention, are prepared by the action of fluorinating agents upon aluminum chloride under anhydrous conditions. Thus aluminum chloride can be converted to aluminum fluoride, or to an aluminum chlorofluoride as disclosed and claimed in my copending application, Serial No. 730,542, filed Apr. 24, 1958, now U.S.P. 3,158,593. Catalysts of particular interest and value in the polymerization of vinyl alkyl ethers are obtained in the fluorination reaction having a varying fluoride content from the material assigned the formula $AlCl_3 \cdot AlCl_2F$ ($Al_2Cl_5F$) up to $AlF_3$.

Aluminum fluoride, prepared according to the examples described below, appears to have a non-crystalline or "amorphous" structure when examined under a high powered optical microscope. By the use of X-ray diffraction teachnique the presence of submicroscopic crystals, called crystallites, has been demonstrated. These crystallites have a radius of 500 Angstrom units or lower. When the radius of these crystallites is further reduced to about 200 Angstroms or lower the catalyst is most effective. Aluminum fluoride suitable for the practice of my invention can be conveniently prepared by the reaction of excess ethylidene fluoride, $CH_3CHF_2$, with anhydrous aluminum chloride dissolved in ethyl chloride. The chlorine atoms in solid crystalline $AlCl_3$ can be replaced by the much smaller fluorine atoms during the reaction without destroying the lattice structure. The $AlF_3$ so prepared is extremely porous and possesses a high surface area and appears amorphous when viewed with a high powered optical microscope.

Aluminum chlorofluorides have similar properties of crystallite structure with high surface area. These catalyst materials are so finely divided that they have flow properties similar to those of liquids.

Aluminum fluoride and aluminum chlorofluorides suitable as catalysts for the polymerization of vinyl alkyl ethers can be made by the reaction of other fluorine containing compounds with an aluminum halide. Aluminum chloride, aluminum bromide, and aluminum iodide can all be used as starting materials for the preparation of aluminum fluoride. Aluminum chloride is preferred for reasons of economy in operating practice. When starting with aluminum chloride I prefer to use a volatile, noncomplexing solvent for the said aluminum chloride;

methyl chloride and ethyl chloride are excellent examples of suitable solvents. Under anhydrous conditions hydrogen fluoride, boron trifluoride, benzotrifluoride, fluorine, antimony pentafluoride, and silicon tetrafluoride have all been used successfully to convert $AlCl_3$ to aluminum chlorofluorides and to aluminum trifluoride that can advantageously be used in catalyzing the polymerization of vinyl alkyl ethers to crystalline high molecular weight solid polymer. Both organic and inorganic fluorine-containing compounds have been used as fluorinating agents. For the halogen interchange reaction I prefer to use fluorination agents which yield volatile by-products to facilitate separation and isolation of the desired aluminum fluoride or aluminum chlorofluoride catalysts. Active and suitable catalysts can also be prepared by the reaction of fluorinating agents with aluminum trialkyls, and alkyl aluminum halides. It will be understood, of course, that fluorine will not be utilized in the presence of organic materials.

In my preferred method of preparing these catalysts, the fluorine-containing compound is slowly added to a saturated solution of $AlCl_3$ in a lower alkyl chloride, for example, ethyl chloride, cooled to about 0° C. The catalyst material precipitates as formed and is so finely divided, absorptive, and of such high surface area that a gel results. The solvent, by-product chlorine containing compound, and the excess fluorine containing reactant, if used, are evaporated under reduced pressure to obtain a dry, free-flowing, finely divided product. For the practice of my invention I have found it desirable to remove essentially all of the by-product chlorine-containing compound from the catalyst; however, the trace quantities that are absorbed upon the catalyst surface apparently have no seriously adverse effects on catalyst activity, although generally catalyst activity is changed by their removal.

As an alternate method, the gel-like material, as previously described, can be added to an inert saturated aliphatic hydrocarbon diluent. The alkyl halide, by-product chloride, and excess fluorine-containing reactant are then volatilized from the diluent and the catalyst is obtained as an extremely finely divided dispersion is the hydrocarbon diluent. The catalyst prepared by this method is so finely divided that the dispersion appears turbid and settles out very slowly.

Aluminum fluoride useful in the practice of my invention can be obtained by the reaction of anhydrous aluminum chloride with one of the above fluorinating agents, added in excess. A typical reaction is

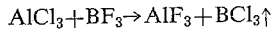

$$AlCl_3 + BF_3 \rightarrow AlF_3 + BCl_3 \uparrow$$

A further embodiment of my practice, however, is the preparation of an aluminum chlorofluoride by the addition of lesser proportions of the fluorinating agent. Catalysts are thus prepared in which the halide portion of the catalyst molecule consists of combinations of chloride and fluoride ions. The following compositions are representative of the compounds that can be used as vinyl alkyl ether polymerization catalysts:

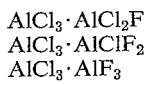

$AlCl_3 \cdot AlCl_2F$  $AlCl_2F \cdot AlF_3$
$AlCl_3 \cdot AlClF_2$  $AlClF_2 \cdot AlF_3$
$AlCl_3 \cdot AlF_3$ It is understood that these compositions, although written as double salts may exist as single molecules such as $Al_2Cl_5F$, $Al_2Cl_3F_3$, $Al_2ClF_5$, $AlCl_2F$ and $AlClF_2$. These compositions as well as mixtures of two or more of these individual compounds are effective for the practice of my invention. These aluminum chlorofluoride catalysts are not simple mixtures of $AlCl_3$ and $AlF_3$, but complex molecules, homogeneous compositions bound by molecular attraction.

The catalysts that are applicable within the scope of my invention are thus aluminum fluoride, and the aluminum chlorofluorides. Aluminum chlorofluorides can be defined as those aluminum halides in which the halide portion of the molecule comprises fluoride and chloride atoms in various proportions. I prefer to use an aluminum chlorofluoride in which the fluoride ions are present in at least 9.7 weight percent of the total halide content.

Catalyst modifiers or activators are included within the scope of my invention. Examples of materials that are effective modifiers include active hydrogen compounds such as alcohols, phenols, amines, mercaptans, fatty acids, and thiophenols. These materials, for example, methanol, ethanol, phenol, dimethylamine, n-dodecyl mercaptan, stearic acid, and thiophenol are effective in regulating the molecular weight of the product polymer. The quantity of modifier to be used is generally small, for example, less than 2% by weight of the vinyl alkyl ether to be polymerized.

In practicing my invention I have found that inert diluents can be used, if desired, in the polymerization of the various vinyl alkyl ethers. The diluent has some utility in controlling the rate and temperature of reaction and it tends to prevent the deposition of solid polymer upon the stirring apparatus and walls of the reactor. This inert diluent is then useful in separating the desired polymer from the catalyst during the product isolation step. Saturated aliphatic hydrocarbons, for example, hexane, octane, nonane, decane, etc., and aromatic compounds, e.g., benzene, toluene, xylene, can be used as inert diluents.

The practice of my invention is not limited to intermittent or batch-type operation, but is adaptable to continuous procedures as well. The catalyst described herein can be deposited on an inert carrier, e.g., alumina, carbon, silica or asbestos or mixtures thereof and the vinyl alkyl ether passed over the catalyst. If desired, the catalyst suspended in an inert diluent can be fed concomitantly with the monomer into the polymerization chamber. Other aspects of continuous operation will be obvious to those skilled in the art. For example, since one form of preferred catalyst is a fine powder that flows like liquid, the polymerization reactor can be modified so that catalyst and monomer can be fed concomitantly into the reactor containing an inert hydrocarbon liquid as diluent.

A particular advantage of my invention is that the process of polymerization does not depend upon a critical narrow range of temperature for operability. I prefer to carry out the reaction at a temperature from about —30° to about 100° C., preferably from about —20° to about 50°. Operation at about room temperature provides convenience in controlling the reaction rate. Previous investigators have shown the polymerization to be somewhat unpredictable and runaway reactions were commonplace. By the use of my invention the polymerization is easily controllable and elaborate cooling means are unnecessary.

Polymerization is maintained at a desirable and economical rate by removing the heat of reaction and by adjusting the flow of monomer and catalyst to the reactor.

The polymers prepared by my invention have characteristic properties not possessed by the polyvinyl ether polymers of the prior art. My polymer products have a high degree of crystallinity when prepared and, furthermore, my polymers give a crystalline X-ray diffraction pattern when examined as fiber or film, without prior orientation, as by stretching for example.

Polymers of vinyl methyl ether previously known have been characterized by water solubility at temperatures below 35° C. and by acetone solubility. My new solid, high molecular weight, crystalline polyvinyl methyl ether does not dissolve in water at 35° C. or lower. This property greatly extends its area of usefulness to wrapping fields, for example, where a water-soluble film would be completely unsatisfactory. My crystalline polyvinyl methyl ether is insoluble in acetone, which further distinguishes it from prior art polymer.

Polyvinyl methyl ether, prepared according to my invention, exhibits irreversible extensibility due to the "necking down" phenomenon. Beyond this limit my polymer is flexible and has rubbery characteristics while retaining a high tensile strength. When processed to a film it is non-tacky, tough, and is highly transparent. The polymer of my invention is not elastic and is non-rubbery when cast or molded since it does not return to its original shape after being distorted or disformed by a stress.

In order to illustrate some of the various aspects of the invention and to serve as a guide in applying the invention the following specific examples are given. It will, of course, be understood that variations from the particular temperatures, pressures, diluents and proportions can be made without departing from the invention.

EXAMPLE 1

A glass reactor immersed in a cooling bath was charged with a saturated, clear solution of $AlCl_3$ in ethyl chloride. The temperature was maintained below 0° C. as ethylidene fluoride, $CH_3CHF_2$, was added in excess of the quantity required to convert all of the $AlCl_3$ to $AlF_3$. Rate of reaction was followed by observing gel formation as $AlF_3$ was obtained. The low-boiling materials were volatilized from the system under reduced pressure as the temperature was increased to room temperature. Volatile material was removed as the product was subjected to a vacuum of <1 mm. mercury for 48 hours. The resulting aluminum fluoride was obtained as a very finely divided free-flowing powder, in essentially quantitative yield based on aluminum chloride charged. Crystallite size of the catalyst prepared according to this procedure has been found to be less than 200 Angstrom units in radius, as determined by the technique of X-ray diffraction line broadening.

EXAMPLE 2

A solution of 50 g. aluminum chloride dissolved in 1000 ml. ethyl chloride cooled to −78° C. was treated with an excess of $BF_3$ for the reaction

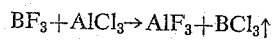

The $BF_3$ dissolved readily and the solution was permitted to warm up. At about 0° C. sudden reaction occurred with the solution being converted to a thick gel. Solvent and low-boiling by-products were removed by volatilization under reduced pressure at room temperature. Traces of volatile materials were removed by storing the product for 16 hours at <1 mm. Hg. A very fine powder that had liquid flow characteristics was obtained the particles thereof having a crystallite radius of less than 500 Angstrom units.

EXAMPLE 3

In a manner similar to Example 2, $AlCl_3$ in ethylchloride was treated with gaseous hydrogen fluoride. After solvent and volatile by-products were removed under reduced pressure the $AlF_3$ was recovered as a porous, somewhat granular powder. This catalyst was pulverized to a fine-free-flowing powder by grinding in a ball mill.

EXAMPLE 4

A 1500 ml. glass reactor was charged with 23.3 g. anhydrous $AlCl_3$ powder and 700 g. ethyl chloride. The $AlCl_3$ slowly dissolved at the boiling point of ethyl chloride. Trace quantities of insoluble material were filtered off and the clear solution was then cooled to −78° C. at which temperature 8.1 g. anhydrous $BF_3$ was added. The solution was slowly warmed to 0° C. and maintained at this temperature for 2 hours. The solution gradually became viscous and the thickening process continued until a gel was obtained. Volatile components were distilled from the reactor under reduced pressure and the product was stored under an applied vacuum of an oil pump (0.1 mm./Hg for 20 hours. The weight of catalyst obtained was 17.45 g., corresponding to the conversion of $AlCl_3$ to $AlClF_2$ according to the equation:

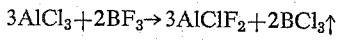

EXAMPLE 5

The procedure used in this preparation of an aluminum chlorofluoride was designed to yield a catalyst having 34.4% fluoride based on the total halide content.

A charge of 50 g. of anhydrous $AlCl_3$ was mixed in 1100 ml. ethyl chloride maintained at reflux until essentially all of the aluminum chloride had dissolved. The solution was filtered and ethylidene fluoride, $CH_3CHF_2$, was added at 0° to 12° C. to convert the $AlCl_3$ to a mixture of $AlClF_2$ and $AlCl_2F$. As halogen interchange took place the solution increased appreciably in viscosity due to gel formation, as the fluorine-containing catalyst was precipitated. The solvent and by-product halides were evaporated at atmospheric pressure followed by vacuum-treating at 0.1 mm./Hg. This catalyst can have the assigned formula $AlClF_2·AlCl_2F$, which may also be written $Al_2Cl_3F_3$, or $AlCl_3·AlF_3$. The formula assigned to this product is not critical nor necessary to its successful utilization.

EXAMPLE 6

An aluminum chlorofluoride catalyst was prepared by the additon of 50 ml. ethylidene fluoride to 300 ml. of a saturated solution of anhydrous $AlCl_3$ in ethyl chloride at −78° C. Halogen interchange, as evidenced by aluminum chlorofluoride-aluminum fluoride gel formation, started immediately. The mixture was gradually warmed to the boiling point of ethyl chloride to complete the reaction. Solvent and by-product halide was evaporated at atmospheric pressure and the catalyst was then stored under reduced pressure. A sample of this product contained 3% chloride by analysis.

EXAMPLE 7

To a small glass reactor were charged 5 ml. vinyl isobutyl ether and 20 ml. anhydrous heptane, and 1 g. of the catalyst from Example 1. In about 15 minutes a deposit of polymer began to form on the catalyst surface. The polymerization was permitted to proceed for 24 hours at room temperature and the catalyst was then quenched with acetone. The polymer-catalyst was thoroughly washed with acetone and the catalyst then dissolved out with dilute aqueous HCl. Extractions with cold water and with acetone are used to purify the polymer. The product polymer was then precipitated from hot heptane by acetone and recovered as a tough granular material. It was molded between hot polished plates at 160° to form a transparent brittle film that exhibited "necking-down" characteristics when cold drawn, a property distinctive of crystalline polymer.

EXAMPLE 8

Aluminum fluoride catalyst, 0.2 g., prepared according to the procedure of Example 2, was added to 10 ml. heptane at 0° and 1 ml. of vinyl isobutyl ether added. Over an interval of 30 minutes 7.5 ml. of vinyl isobutyl ether was added with intermittent agitation. The mixture was then stored for 16 hours at 0°. The mixture of polymer and catalyst was filtered and the catalyst removed by extraction with aqueous HCl. The polymer was precipitated from a heptane solution with acetone. The polyvinyl isobutyl ether was pressed into a thin film between polished plates at 160° C. This film "necked down" upon cold drawing. The processing characteristics of this polymer, the necking down phenomenon and the high molding temperature required, are characteristic of crystalline high molecular weight polymer.

EXAMPLE 9

A mixture of 20 ml. dry isoheptane, 5 ml. of vinyl methyl ether and 0.1 g. $AlF_3$, prepared according to the procedure of Example 3, were charged to a glass ampule and stored at −78° with intermittent agitation. There was no evidence of polymerization at this low temperature; however, when the mixture was warmed to about 10° polymerization occurred at a moderate rate and the polymer became visible as it precipitated.

The polymer-catalyst was separated from the diluent by filtration and the polyvinyl methyl ether extracted by successive portions of hot methanol. Polymer was then coagulated by water, separated and dried. This product was molded to a clear, homogeneous film at 160–170° C. Strips cut from this film were cold drawn to demonstrate the inherent crystallinity of the polymer. A strip of this polyvinyl methyl ether film, when immersed in water for 30 days at room temperature was slightly weakened but did not dissolve. Strips of the product film retained their shape and size when immersed in acetone at room temperature for 30 days.

EXAMPLE 10

Anhydrous aluminum fluoride, 1.0 g., prepared according to the procedure of Example 1, was suspended in 300 ml. ethyl chloride cooled to −78° C. and 50 g. vinyl methyl ether condensed into the diluent. There was no visible evidence or polymerization after storage of the reactants for 16 hours at −78° C.

When the charge was warmed to 0° C. with agitation, a precipitate of solid polyvinyl methyl ether began to form. The reaction appeared to be complete after 5 hours at 0° C. Solid polymer and catalyst were filtered and the polymer was extracted with hot methanol and then precipitated by the addition of hot water, and washed with cold water, followed by acetone, and dried. The polyvinyl methyl ether was molded to a clear, tough, orientable, non-tacky film at 165° C. This film had a tensile strength of 900 p.s.i. with 40% elongation at its yield point and a tensile strength of 1450 p.s.i. with 450% elongation at the break point. These properties are indicative of the highly crystalline nature of the polymer prepared by my invention.

EXAMPLE 11

To a mixture of dry octane and aluminum chlorofluoride from Example 4 was added vinyl isobutyl ether and the reactants were stirred for two hours at 25°. The solid polymer was leached from the catalyst surface with boiling octane. The catalyst was then recharged to the reactor and additional vinyl isobutyl ether was added. The catalyst retained its high activity and solid polymer was again isolated from the catalyst surface after two hours reaction time at 25°. After this procedure had been repeated for four times the catalyst still retained its activity.

EXAMPLE 12

A mixture of 35 ml. octane, 10 ml. vinyl 2-ethylhexyl ether and 1 g. aluminum chlorofluoride from Example 5 was stirred at room temperature. After several hours solid polymer had begun to deposit on the catalyst surface. The mixture of catalyst and polymer was filtered off and the catalyst extracted with aqueous HCl. The product polymer was then precipitated from hot octane with acetone. This polymer was molded to a clear stiff film, which exhibited the "necking down" phenomenon when cold drawn.

EXAMPLE 13

Commercial grade $AlF_3$ powder was ground in a mortar under isooctane. A mixture of 5 g. of this $AlF_3$, 10 ml. diisooctane and 10 ml. vinyl isobutyl ether was stirred for 24 hours at room temperature. After filtration the solid material collected was extracted with aqueous HCl. No solid polymer was found after the catalyst was removed indicating that this aluminum fluoride was ineffective as a polymerization catalyst.

EXAMPLE 14

A sample of 1.0 g. aluminum chlorofluoride catalyst from Example 6 was dispersed in 20 ml. ethyl chloride and cooled to −10° C. Vinyl methyl ether was slowly added to this dispersion which was stirred by mechanical means. Polymerization started immediately and, with continued addition of vinyl methyl ether, a thick slurry of polymer was formed within a short time. Addition of monomer was stopped when stirring did not provide effective agitation. A large excess of acetone was then added and the slurry heated to boiling. Acetone-insoluble polymer was recovered by centrifugation, and separated from catalyst by extraction with boiling benzene. The crystalline polymer, recovered by precipitating from benzene by addition of hexane, resembled high pressure polyethylene in its physical properties, but had vastly improved clarity over the polyethylene.

EXAMPLE 15

Aluminum chlorofluoride from Example 5, 2.0 g., was added slowly with efficient mixing to a mixture of 10 ml. vinyl isobutyl ether and 40 ml. anhydrous heptane at room temperature. Water bath cooling was employed to maintain the temperature at about 30° C. A coating of polymer could be observed building up on the catalyst surface. Excess heptane was added with heating to extract the polymer from the catalyst, and the polymer was then precipitated with acetone. The polymer was pressed to a non-tacky flexible film between polished heated plates; it had rubbery properties and gave a crystalline X-ray diffraction pattern.

EXAMPLE 16

Polymer from vinyl methyl ether, prepared according to the procedure of Example 14, was molded to a clear, orientable, non-tacky film at 160–165° C. This film had a tensile strength of 1557 p.s.i. with 20% elongation at its yield point and a tensile strength of 2823 p.s.i. with 306% elongation at the break point.

The polyvinyl methyl ether was also subjected to the Clash-Berg modulus test. This is a measure of the stiffness of a plastic specimen as a function of temperature, measured by means of a torsional test. The test is essentially that described by Clash and Berg in Industrial Engineering Chemistry 34, 1218 (1942). This polymer had a brittle temperature ($T_f$) of −19.5° C., the temperature at which the stiffness modulus is 135,000 p.s.i., and a rubber temperature ($T_{2000}$) of +109.5° C., the temperature at which the stiffness modulus is 2000 p.s.i. The 25° C. modulus was 33,500 p.s.i., a measure of the stiffness of the polymer at room temperature. The Stifflex Range ($T_{200}$ minus $T_f$) is 129.0° C., and is a measure of what can be called the transition range of the polymer.

The density of this polyvinyl methyl ether was 1.0819.

While the invention has been described with particular reference to preferred embodiments thereof, it will be appreciated that variations from the details given herein can be effected without departing from my invention in its broadest aspects.

I claim:

1. The process of polymerizing a vinyl alkyl ether, wherein said alkyl group contains from 1 to 14 carbon atoms, to solid, high molecular weight, crystalline polymer by contacting said vinyl alkyl ether with a catalyst selected from the group consisting of aluminum chlorofluorides and aluminum fluoride obtained by the fluorination of an aluminum halide selected from the group consisting of aluminum chloride, aluminum bromide, and aluminum iodide.

2. The process of polymerizing a vinyl alkyl ether having the formula $CH_2=CHOR$, where R is a saturated aliphatic hydrocarbon radical having from 1 to 14 carbon atoms, by contacting said vinyl alkyl ether with a catalyst selected from the group consisting of aluminum chlorofluorides and aluminum fluoride obtained by the fluorination of aluminum chloride.

3. The process for polymerizing a vinyl alkyl ether having the formula $CH_2=CHOR$, where R is a saturated aliphatic hydrocarbon radical having from 1 to 14 carbon atoms, which comprises contacting said vinyl alkyl ether with a catalyst selected from the group consisting of aluminum chlorofluorides and aluminum fluoride, wherein said aluminum halide catalysts are prepared by the fluorination of aluminum chloride, and separating high molecular weight crystalline polymer from said catalyst.

4. The process of claim 3 wherein the temperature during polymerization is maintained at −20° to +50° C.

5. The process of claim 3 wherein an aluminum chlorofluoride catalyst is used having a fluoride content of at least 9.7% of the halide present in said aluminum chlorofluoride.

6. The process of claim 3 wherein the catalyst is prepared by the reaction of anhydrous aluminum chloride with a fluorinating agent selected from the group consisting of hydrogen fluoride, boron trifluoride, ethylidene fluoride, and benzotrifluoride.

7. The process for the preparation of crystalline, high molecular weight, solid polymer of a vinyl alkyl ether having the formula $CH_2=CHOR$, where R is a saturated aliphatic hydrocarbon radical having from 1 to 14 carbon atoms, which comprises contacting said vinyl alkyl ether with a catalyst comprising aluminum fluoride having a crystallite radius of less than about 500 Angstrom units.

8. The process for the preparation of a crystalline, high molecular weight polyvinyl methyl ether which comprises contacting vinyl methyl ether, at −20° C. to +50° C., in the presence of an inert hydrocarbon diluent, with a catalyst comprising aluminum fluoride prepared by the fluorination of an aluminum halide selected from the group consisting of aluminum chloride, aluminum bromide and aluminum iodide.

9. The process for the preparation of a crystalline, high molecular weight polyvinyl methyl ether by the polymerization of vinyl methyl ether at −20° C. to +50° C. in the presence of an inert hydrocarbon diluent, by the use of a catalyst comprising an aluminum chlorofluoride in which at least 9.7% of the total halide content of the catalyst consists of fluoride.

10. The process for the preparation of a solid, high molecular weight crystalline polymer by the polymerization of a vinyl alkyl ether wherein the alkyl chain contains from 1 to 14 carbon atoms which comprises contacting said vinyl alkyl ether with a catalyst selected from the group consisting of aluminum fluoride and aluminum chlorofluorides having the catalytic properties of aluminum fluoride and aluminum chlorofluorides prepared by the fluorination of anhydrous aluminum chloride.

11. The process which comprises polymerizing a vinyl alkyl ether in the presence of an aluminum halide catalyst, wherein at least 9.7% of the total halide content of said catalyst consists of fluoride.

References Cited

UNITED STATES PATENTS

| | | | |
|---|---|---|---|
| 2,542,610 | 2/1951 | Young | 260—91 |
| 2,799,669 | 7/1957 | Zoss | 260—91 |
| 2,549,921 | 4/1951 | Mosley | 260—91.1 |
| 2,964,455 | 12/1960 | Graham | 260—154 |
| 3,026,290 | 3/1962 | Gluesenkamp | 260—88.1 |

FOREIGN PATENTS

| | | |
|---|---|---|
| 571,741 | 1/1958 | Italy. |
| 571,741 | 4/1958 | Italy. |

OTHER REFERENCES

Natta et al.: Die Makro. Chemie, vol. 16–19 (1956) pp. 455–462.

Natta et al.: J.A.C.S., vol. 77, (1955), pp. 1708–1710.

Miller et al.: Journal of Polymer Science, vol. 44, pages 391–5, 1960.

Schildknecht et al.: Industrial and Engineering Chem., vol. 41, September 1949, pp. 1949 to 2003.

Mark et al.: Physical Chemistry of High Polymeric Systems, Interscience 1950, pp. 321 to 323, 357 to 359 and 363.

Short et al.: Rubber Chemistry and Technology, vol. 32, 1959, pp. 614–616, 620 and 621.

Clash and Berg: Industrial & Engineering Chem., vol. 34, October 1942, pp. 1218 to 1222.

Okamura et al.: Die Makromolekulare Chemie., vol. 50, 1961, pp. 137–139, 146.

Bovey et al.: J. of Polymer Science, vol. 44, pp. 173–182, 1960.

Vandenberg: J. of Polymer Science, Part C, Polymer Symposia No. 1, 1963, pp. 207, 208, 213, 218, 219, 220, 225 to 229, 234.

WILLIAM H. SHORT, *Primary Examiner.*

M. STERMAN, P. E. MANGAN, H. BURSTEIN,
*Examiners.*

R. J. BUTTERMARK, J. T. BROWN, H. D. ANDERSON, *Assistant Examiners.*